United States Patent [19]

McCarty

[11] Patent Number: 4,951,459
[45] Date of Patent: Aug. 28, 1990

[54] METHODS FOR METERING FLUID AND APPARATUS FOR USE THEREWITH

[75] Inventor: Robert S. McCarty, Phoenix, Ariz.

[73] Assignee: Allied-Signal Inc., Morris Township, N.J.

[21] Appl. No.: 238,370

[22] Filed: Aug. 30, 1988

[51] Int. Cl.[5] .......................... F02C 7/232; F02C 9/26
[52] U.S. Cl. .................................. 60/39.03; 60/39.281
[58] Field of Search ................ 60/39.03, 39.281, 734; 137/624.15; 251/129.05

[56] References Cited

U.S. PATENT DOCUMENTS

| | | | |
|---|---|---|---|
| 3,292,367 | 12/1966 | Bauger et al. | 60/39.141 |
| 3,946,551 | 3/1976 | Linebrink et al. | 60/39.141 |
| 4,015,426 | 4/1977 | Hobo et al. | 60/39.281 |
| 4,386,553 | 6/1983 | Thoman et al. | 60/39.281 |
| 4,454,713 | 6/1984 | Meyer et al. | 60/39.281 |
| 4,609,011 | 9/1986 | Uehara | 137/624.15 |

FOREIGN PATENT DOCUMENTS 1437736 6/1976 United Kingdom ........... 137/624.15

Primary Examiner—Louis J. Casaregola
Attorney, Agent, or Firm—Joseph R. Black; James W. McFarland; Robert A. Walsh

[57] ABSTRACT

Methods for metering fluid flow and apparatus adapted for use with the methods. The apparatus (5) comprises an electrohydraulic solenoid (6) secured to and in fluid communication wiht a metering valve body (8). A cylindrical spool (15) is disposed in a channel (16) formed in the valve body (8), and variably blocks a flow path (74,90,75) extending through the valve body in response to variations in fluid pressure in a chamber (68) which is defined by the solenoid (6), the valve body (8), and the spool (15). Fluid is delivered to and vented from the chamber (68) through the solenoid (6), and the pressure in the chamber varies with the duty cycle of pulses communicated to the solenoid (6).

6 Claims, 2 Drawing Sheets

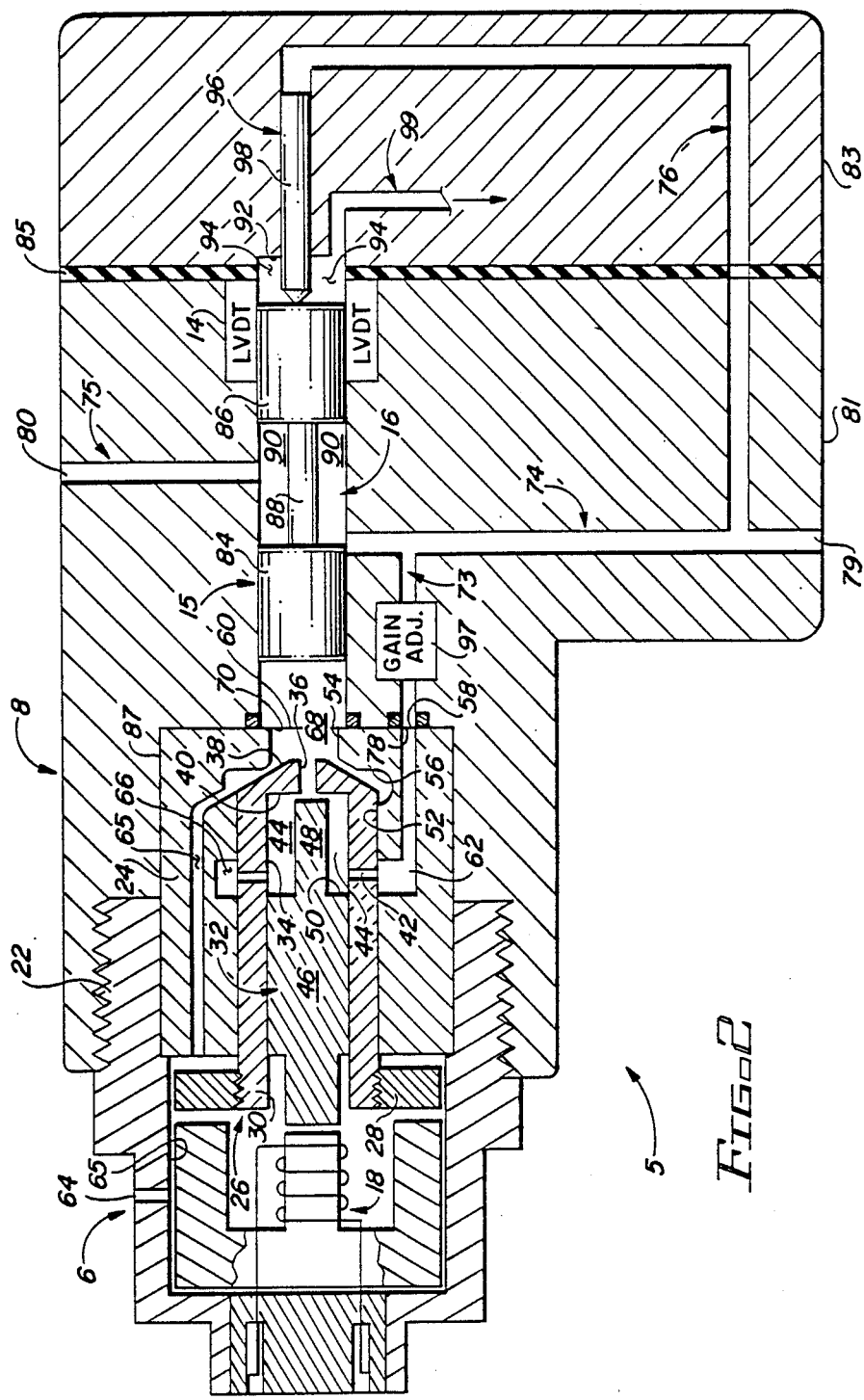

METHODS FOR METERING FLUID AND APPARATUS FOR USE THEREWITH

BACKGROUND OF THE INVENTION

1. Technical Field

The present invention relates to methods for metering the flow of fluid from a source to a load, and to apparatus adapted for use therewith. More particularly, the invention pertains to such subject matter employing an electrohydraulic solenoid secured to and in fluid communication with a metering valve body which defines a fluid channel in which a metering valve is positioned to directly and partially block a flow path between the source and the load.

2. Related Art

The use of solenoids and solenoid/valve combinations in metering the flow of fluid between a source and a load is known, as is illustrated by U.S. Pat. Nos. 4,386,553 Thoman et al. and 4,640,093 Eastman.

U.S. Pat. No. 4,640,093 discloses a system that directly meters fuel to a turbine engine by opening a control port in response to pulses applied to a solenoid to provide an average flow area that is proportional to the duty cycle of the pulses. The range of flow rates over which the system may be precisely operated is suspect because of the use of a secondary flow path which is employed at or above a certain required flow rate. The relatively sudden use of this flow path may produce sudden spikes in metered fuel flow and complicate the calibration process. Moreover, the use of diaphragms in the system may render it less robust and more limited in its range of application as compared to the present invention.

U.S. Pat. No. 4,386,553 discloses a control system for a doser actuator in which a pair of solenoids is used to variably pressurize two chambers in fluid communication with a reciprocating piston-pair member. The fluid pressures in the chambers apply opposing hydraulic forces to the piston-pair member in order to vary its position in a stepped channel. The system effects metering by using the piston-pair member as an actuator that controls the position of a fuel metering valve by unspecified means. The system requires more solenoids and consequently more cumbersome control circuitry than the present invention which, as will be evident from the following description, provides a more functionally-integrated approach to metering fluid flow.

SUMMARY OF THE INVENTION

This invention provides methods and apparatus for metering the flow of fluid from a source thereof to a load. The metering is directly accomplished by controlling a difference in applied force that is developed across a piston which is positioned in a flow path between the source and the load such that the piston partially blocks the flow path. The difference in applied force is controlled by varying the fluid pressure in a chamber which is defined by the piston, a metering valve body in which the piston is disposed, and an electrohydraulic solenoid in fluid communication with the metering valve body. The fluid pressure in the chamber therefore defines one of the forces applied to the piston. Fluid flows into and is vented from the chamber through the solenoid, and the net flow into the chamber is proportional to the duty cycle of constant-frequency pulses applied to the solenoid.

An objective of the invention is to provide a more functionally-integrated flow metering system adapted for more direct and precise control, whereby an electronic output signal communicated from an electronic controller can be converted directly to a hydraulic effect which determines the rate of flow from the source of fluid to the load. A related objective is to overcome limitations in accuracy and response time associated with conventional metering valves. These and other objectives and advantages of the present invention will be apparent from the following description of the preferred embodiment thereof, when read in conjunction with the accompanying drawings and appended claims.

BRIEF DESCRIPTION OF THE DRAWINGS

FIG. 2 is a generally cross-sectional, partially schematic illustration of the fluid-metering apparatus identified in FIG. 1.

DESCRIPTION OF THE PREFERRED EMBODIMENT

Figure 1:
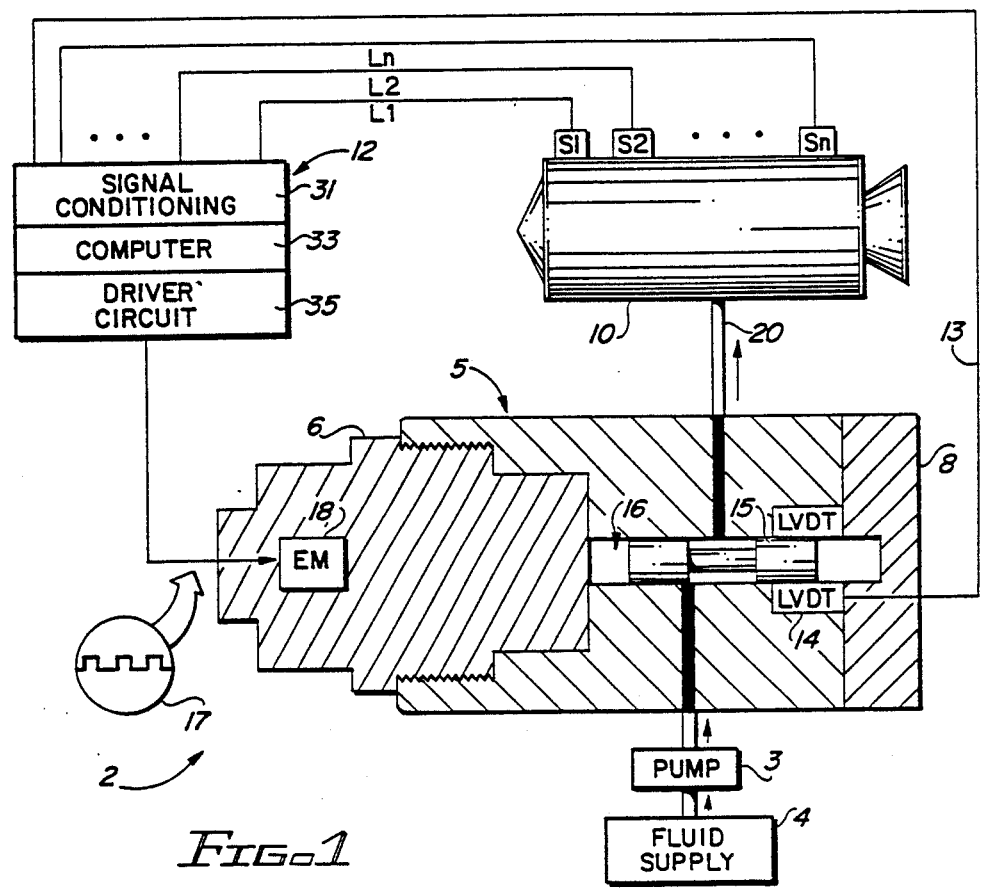
FIG. 1 is a partially schematic, partially cross-sectional diagram illustrating a gas turbine engine with a fuel flow control system embodying the present invention.

Referring to FIG. 1, the numeral (2) designates a system metering the flow of fluid delivered via a pump (3) from a supply (4) to a load. The system (2) employs apparatus (5) comprising an electrohydraulic solenoid valve (hereinafter solenoid) (6) to which a metering valve body (8) is rigidly secured by suitable means. In the best currently contemplated application for the present invention, the load may be considered the fuel intake demand of a gas turbine engine (10). Accordingly, although the word "fuel" will be used hereinafter to describe the metered fluid, it will be recognized that there are numerous other applications for the invention. Typically, the fuel is delivered from the metering valve body (8) through a flow divider and a plurality of atomizers (not shown) to a combustor in the engine (10) in accord with the fuel intake demand. In FIG. 1, delivery is simply represented by conduit (20).

The fuel intake demand of the turbine engine (10) is determined automatically by an engine controller (12) (which may comprise signal conditioning circuitry (31), a computer (33), and a driver circuit (35), for example) in response to various operating conditions as indicated by a plurality of sensors S1,S2, ... Sn. The controller (12) responds to the signals (indicated by lines L1,L2, ... Ln) communicated from the sensors, and to signals (represented by line (13)) communicated from an LVDT (14) which indicate the position of a piston-pair member (15) (a sliding cylindrical spool) in a first channel (16) formed in the metering valve body (8), to adjust the duty cycle of constant-frequency pulses (17) delivered to the electromagnet (18) of the solenoid (6). The apparatus (5) is sized so that a required differential pressure can be obtained across the metering valve body (8), as viewed in a direction corresponding to the flow path (indicated by the darkened portion in FIG. 1 and also including the chamber (90) in FIG. 2) extending therethrough. The required differential pressure is maintained by conventional means (not shown) as, for example, by providing a sensing line for fluid communication from a position downstream from the indicated flow path to a by-pass valve in a loop connected across the pump (3). The magnitude of the required differential pressure is stored in the memory of the computer (33), as is the cross-sectional area of a channel (74) (FIG. 2) which is in fluid communication with the first channel (16) and partially blocked by the piston-pair member (15). Since the portion of this cross-sectional area that is unblocked by the member (15) depends on the position of the member, and since the differential pressure across the valve body (8) is constant, the signals (13) indicate the rate at which fuel is delivered to the engine (10).

Although the electrohydraulic solenoid (6) herein described is not inherently novel, essential details thereof are described below so that operation of the entire apparatus (5) can be easily understood.

Referring now to FIG. 2, the solenoid (6) comprises a housing preferably constructed in two sections (22,24). The housing sections (22,24) contain the electromagnet (18), an inner valve (32), and a core member (26) that is retractable in response to energization of the electromagnet and that defines an armature (28) and outer valve (30).

The outer valve (30) is of generally cylindrical configuration, defines an axially-extending stepped bore having larger-diameter and smaller-diameter portions (34,36), and has a beveled end (38). The larger-diameter portion (34) of the stepped bore extends from the opposite end of the core member (26) (the end facing the electromagnet (18)) to a step (40) which defines a valve seat for the inner valve (32). The axial length of the inner valve (32) is sufficiently greater than the length of the larger-diameter portion (34) of the stepped bore to ensure that the valve (32) is seated when the core member (26) is fully retracted. The smaller-diameter portion (36) extends from the step (40) to the beveled end (38). The outer valve (30) further defines a fluid transfer passage (42) extending from the outer surface of the valve to the larger-diameter portion (34) of the stepped bore. The fluid transfer passage (42) meets the larger-diameter portion (34) of the stepped bore at an axial location such that the passage is always in fluid communication with a first chamber (44).

The inner valve (32) is coaxial with the outer valve (30) and is slidably disposed in the larger-diameter portion (34) of the stepped bore. The inner valve (32) is of stepped cylindrical configuration and has larger-diameter and smaller-diameter portions (46,48), thus defining a step (50). The step (50) cooperates with the outer valve (30) and the smaller-diameter portion (48) of the inner valve to define the first chamber (44).

One housing section (24) defines a stepped bore having larger-diameter and smaller-diameter portions (52,54) thus forming a step (56). The step (56) is preferably beveled and defines a valve seat for the outer valve (30), the latter being slidably disposed in the larger-diameter portion (52). The housing section (24) further defines an inlet port (58), an outlet port (60) for the solenoid (6), and a fluid inlet channel (62). The housing section (22) defines a vent port (64). The housing sections (22,24) define a fluid vent channel (65) in fluid communication with the vent port (64).

The inlet port (58) is in fluid communication with the first chamber (44) via the fluid inlet channel (62) which extends from the port to the fluid transfer passage (42). The fluid inlet channel (62) includes an annulus (66) to ensure constant fluid communication irrespective of rotation of the outer valve (30). The vent port (64) is in fluid communication with a second chamber (68) via the fluid vent channel (65) except when the outer valve (30) is in a fully extended position and therefore seated. The outlet port (60) is in fluid communication with a first port (70) of the metering valve body (8).

The outer valve (30) is of slightly smaller diameter than the larger-diameter portion (52) of the stepped bore in the housing section (24) so that when the electromagnet (18) is energized, the valve slides along the inside of the housing. The larger-diameter portion (46) of the inner valve (32) is of slightly smaller diameter than the larger-diameter portion (34) of the stepped bore in the outer valve (30) so that when the electromagnet (18) is energized and the core member (26) retracted, the outer valve slides along the inner valve.

The metering valve body (8) is threadably engaged with the solenoid (6) as indicated. The metering valve body (8) has two sections (81,83) joined by suitable means (not shown) and having a seal (85) therebetween. A multi-stepped bore (87) receives the solenoid (6) and defines the first channel (16), a seat for the LVDT (14), and a portion (96) of a fifth channel (76). The valve body (8) also defines a series of bores providing second, third, fourth, and sixth channels (73,74,75,99), a lead passage (not shown) for the LVDT, and the remainder of the fifth channel (76). The first, second, third, and fourth channels (16,73,74,75) define at spaced peripheral portions of the body (8) respective first, second, third, and fourth ports (70,78,79,80). The first channel (16) extends from the first port (70) to an inner terminal (92). The second channel (73) extends from the second port (78) to the third channel (74). The third channel (74) extends from the third port (79) to the first channel (16). The fourth channel (75) extends from fourth port (80) to the first channel (16). The fifth channel (76) extends from the third channel (74) to the inner terminal (92). The sixth channel (99) is provided for fluid communication between a fourth chamber (94) and the fuel input to the pump (3) and serves to vent fluid from the chamber when it is contracted by movement of the piston-pair member (15).

Slidably disposed in the first channel (16) is the piston-pair member (15). In operation, the member (15) partially blocks flow from the third channel (74) to the fourth channel (75). The member (15) has two pistons (84,86) and a smaller-diameter portion (88). The portion of the first channel (16) corresponding to the axial range of the smaller-diameter portion (88) of the member (15) defines a third chamber (90) which is in fluid communication with both the third and fourth channels (74,75). The portion of the first channel (16) extending from the inner terminal (92) to the near piston (86) defines the fourth chamber (94). The metering valve body (8) is secured to the solenoid housing (22,24) such that the outlet port (60) is in fluid communication with the first port (70), and the inlet port (58) is in fluid communication with the second port (78). The second chamber (68) includes a portion of the first channel (16) and is defined by the metering valve body (8), piston (84), housing section (24) and outer valve (30). The third port (79) is a supply inlet port for receiving pressurized fuel at pump discharge pressure. The fourth port (80) is an outlet port through which fuel is delivered to the engine (10) (FIG. 1).

As indicated, the third channel (74) provides fluid communication from the third port (79) to the second channel (73), the fifth channel (76), and to the fourth channel (75) via the third chamber (90). The second channel (73) provides fluid communication from the third channel (74) to the inlet port (58), and the fifth channel (76) provides fluid communication from the second channel to a return piston (98). A portion (96) of the fifth fluid channel (76) is longitudinally aligned with the first channel (16). Slidably disposed in this portion (96) is the return piston (98) which also partially occupies the fourth chamber (94) and is therefore urged against the reciprocating piston (15) by fuel in the fifth channel (76).

Operation of the apparatus (5) would proceed as follows. Fuel delivered from the pump (3) through the third port (79) pressurizes all channels (16,73-76) in the metering valve body (8) as well as the fluid inlet channel (62), the fluid transfer passage (42), and the first chamber (44). The flow rate into the fluid inlet channel (62) and thus the response of the member (15) may be adjusted by incorporating in the metering valve body (8) suitable flow adjustment means (97) (e.g. a needle valve or other conventional means) in fluid communication with the second channel (73). The orifice size of the flow adjustment means (97) would of course be larger at all times than the smaller-diameter portion (36) of the bore formed in the outer valve (30). Fluid pressure in the first chamber (44) moves the inner valve (32) toward the electromagnet (18) until its movement is stopped by contact therewith, and tends to move the outer valve (30) toward its fully extended position. Fuel flows from the first chamber (44) to the second chamber (68) through the smaller-diameter portion (36) of the stepped bore and pressurizes the second chamber (68). A hydraulic force proportional to the fluid pressure in the second chamber (68) is applied to the piston (84), tending to push the piston toward the inner terminal (92) of the first channel (16) and therefore tending to increase the extent to which the piston blocks fuel flow from the third channel (74) into the third chamber (90) and thus to the engine (10) via the fourth channel (75). An opposing force proportional to the fluid pressure in the fifth channel (76) is exerted on the other piston (86) of the member (15) by the return piston (98), tending to push the member away from the inner terminal (92) and therefore tending to decrease the extent to which the piston (84) blocks fuel flow into the third chamber (90). The piston-pair member (15) is dimensioned with respect to the first channel (16) so that the one piston (84) completely blocks flow from the third channel (74) to the first channel if the other piston (86) contacts the inner terminal (92), and so that the other piston (86) does not impede flow into the fourth channel (75) if the one piston (84) contacts the solenoid housing section (24).

The area of piston 84 that faces the second chamber (68) is greater than the area of the return piston (98) that is acted upon by fuel in the fifth channel (76). Accordingly, the member (15) will move until stopped by the inner terminal (92) unless fluid pressure in the second chamber (68) is sufficiently decreased.

The fluid pressure in the second chamber (68) is decreased by energizing the electromagnet (18) with the pulses (17), thus retracting the core member (26), which opens the fluid vent channel (65) and decreases the clearance between the inner valve (32) and step (40) to a degree which depends upon the duty cycle of the pulses. Accordingly, fuel flow into the fourth channel (75) is proportional to the duty cycle. Fuel escaping through the vent port (64) is returned to the supply (4).

Figure 3:
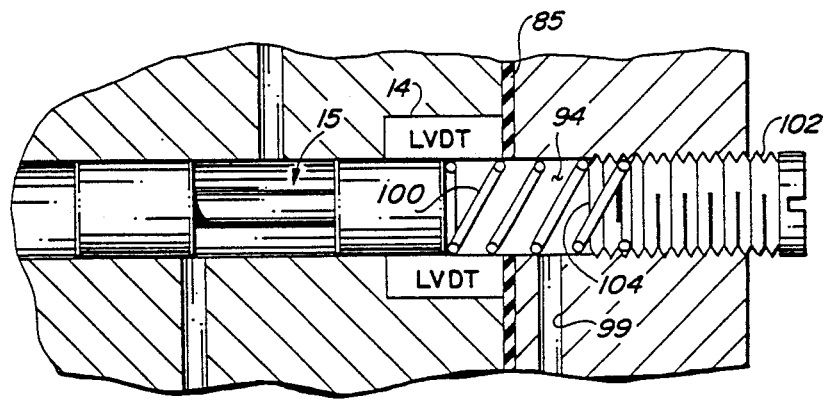
FIG. 3 is a partial cross-sectional drawing illustrating an alternative form of the apparatus of FIG. 2.

FIG. 3 illustrates an alternative arrangement for the metering valve body (8) in which the fifth channel (76) is eliminated and the hydraulically-driven return piston (98) (FIG. 2) is replaced with alternative means for biasing the member (15) in the form of a spring (100) disposed in the fourth chamber (94). This alternative arrangement would preferably include means for adjusting the spring force exerted by the spring (100) on the member (15), as by incorporating an adjustment screw (102), the inner-facing end (104) of which would define the inner terminal of the first channel (16). The spring (100) therefore tends to urge the member (15) away from the inner terminal.

From the foregoing description, it should be clear that the invention provides a new and advantageous method for metering fluid flow from a source to a load. By providing an apparatus (5) in which the electrohydraulic solenoid (6) is joined to the metering valve body (8) in a functionally-integrated configuration, the invention further provides a method comprising the steps of positioning the piston (84) in the channel (16) to partially block the flow path between the source and the load, pressurizing the chamber (68) with fluid delivered from the source through the solenoid (6) and to the chamber to exert on the piston (84) a force that tends to move the piston in a direction such that the piston blocks the flow path to a greater extent, exerting on the piston a second force that tends to move the piston in a direction such that the piston blocks the flow path to a lesser extent, communicating a continual stream of electrical pulses (17) to the solenoid (6) thereby causing fluid pressure in the chamber (68) to change in response to the pulses, and varying the extent to which the piston (84) blocks the flow path by modulating the duty cycle of the pulses.

Having described the preferred embodiment, it should be understood that the description is intended as illustrative rather than restrictive. Accordingly, the invention herein described is limited only by the following claims and their equivalents.

What is claimed is:

1. A method for metering flow of fuel delivered to a turbine engine, comprising the steps of:
   positioning a piston in a channel which partially defines a flow path extending from an inlet to an outlet of a metering valve body so that the piston partially blocks the flow path;
   pressurizing a chamber defined in part by the piston with fuel delivered from a source thereof through the metering valve body, through a single electrohydraulic solenoid valve rigidly secured to the body and defining in part the chamber, and then to the chamber, therby causing the fuel in the chamber to exert on the piston a force that tends to move the piston along the channel in a direction such that the piston blocks the flow path to a greater extent;
   exerting on the piston by means contained in the metering valve body a second force opposing that exerted by fuel in the chamber, the second force tending to move the piston along the channel in a direction such that the piston blocks the flow path to a lesser extent;
   communicating a continual streak of electrical pulses to a solenoid of the solenoid valve and causing pressure in the chamber to change in response to the pulses; and
   varying the extent to which the piston blocks the flow path by duty cycle modulation of the pulses.

2. A method as in claim 1 wherein fuel is vented from the chamber in response to the pulses communicated to the solenoid.

3. A method as in claim 2 further comprising the step of deriving signals that indicate the position of the piston in the channel.

4. A method as in claim 1 further comprising the step of deriving signals that indicate the position of the piston in the channel.

5. A method as in claim 3 further comprising the step of delivering the fuel to a turbine engine.

6. A method as in claim 5 wherein the exerting step is performed by a second piston in response to fluid pressure.

* * * * *